(12) United States Patent
Shuniak et al.

(10) Patent No.: US 7,099,468 B1
(45) Date of Patent: Aug. 29, 2006

(54) TELEPHONE HANDSET RESTRAINING MECHANISM

(75) Inventors: Steven W. Shuniak, Tierra Verde, FL (US); Jeff T. Pound, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 419 days.

(21) Appl. No.: 09/948,463

(22) Filed: Sep. 6, 2001

(51) Int. Cl.
*H04M 1/00* (2006.01)

(52) U.S. Cl. ........................... 379/455; 379/443
(58) Field of Classification Search ............... 379/443, 379/444, 446, 454, 455, 435, 436
See application file for complete search history.

(56) References Cited

U.S. PATENT DOCUMENTS

| | | | |
|---|---|---|---|
| 1,883,549 A | 10/1932 | Carr | |
| 2,494,449 A | 1/1950 | Obergfell | 179/100 |
| 3,301,969 A | 1/1967 | Darling et al. | 179/189 |
| 3,469,041 A | 9/1969 | Winston | 179/189 |
| 3,878,343 A * | 4/1975 | Van De Wall | 379/435 |
| 4,117,276 A | 9/1978 | Zurawski | 179/161 |
| 4,153,823 A | 5/1979 | Hanson | 179/189 R |
| 4,845,738 A * | 7/1989 | Takano | 379/443 |
| 4,965,824 A | 10/1990 | Hollowed et al. | 379/428 |
| 5,181,242 A | 1/1993 | Stack | 379/445 |
| 5,410,597 A * | 4/1995 | Kepley et al. | 379/446 |
| 5,652,792 A * | 7/1997 | Gallagher et al. | 379/446 |
| 5,835,586 A * | 11/1998 | Skowronski | 379/446 |

* cited by examiner

*Primary Examiner*—Benny Quoc Tieu
(74) *Attorney, Agent, or Firm*—Baker Botts L.L.P.

(57) ABSTRACT

A telephone handset restraining and release mechanism comprises a cup-shaped enclosure for receiving and restraining the transmitter end of a telephone handset. This cup-shaped enclosure is mounted to the top surface of a housing that also supports a receiver end restraining mechanism. The receiving end restraining mechanism comprises a roller mounted to a slidable bracket biased into a telephone handset restraining position by means of cushioning spring pads.

2 Claims, 3 Drawing Sheets

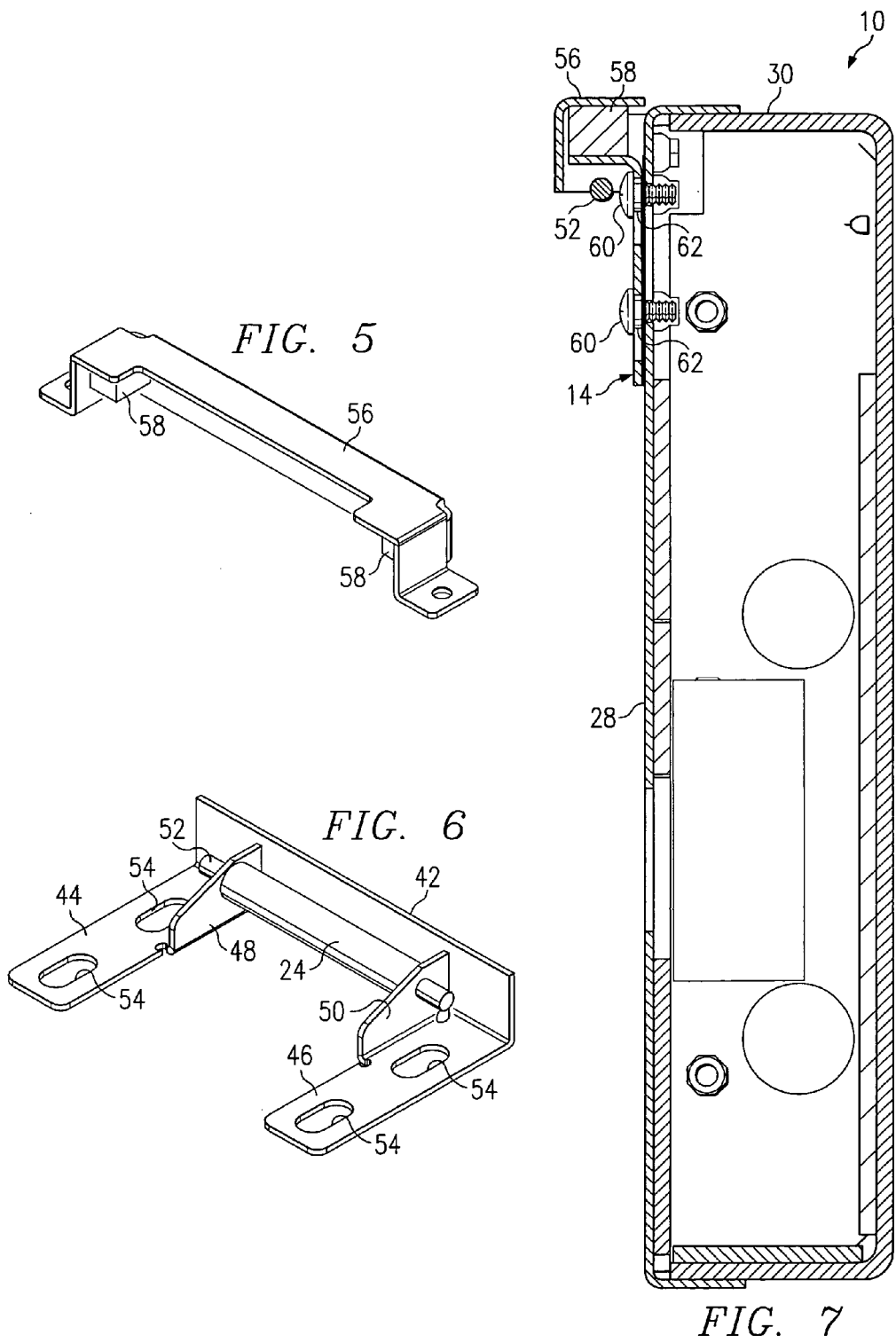

TELEPHONE HANDSET RESTRAINING MECHANISM

This invention was made with Government support under IOT 50-43S8-02300-3, titled "LPD-17 Integrated Voice Communication System", prime contract to U.S. Navy through Avondale Shipbuilding Alliance. The Government has certain rights in this invention.

TECHNICAL FIELD OF THE INVENTION

This invention relates to a telephone handset restraining apparatus, and more particularly to apparatus for restraining a telephone handset in a handset cradle and for one hand removal of the telephone handset for use thereof.

BACKGROUND OF THE INVENTION

When telephone equipment having a telephone handset is utilized in environments subject to shock and vibration, it has been found advantageous to utilize a mechanism that restrains the handset from becoming unintentionally dislodged from a handset cradle. Typical environments that warrant the use of a restraining mechanism in accordance with the present invention include, but are not limited to, those frequently observed on board aircraft, maritime vessels, and high speed trains. In such environments, an unrestrained telephone handset may be unintentionally dislodged, possibly becoming a projectile and causing injury to personnel or damage to the handset or other equipment in close proximity to the handset.

There are many mechanisms described in the patent literature and available on the market that are intended to lock and thereby prevent unauthorized use of telephone equipment. Telephone handset locking mechanisms are intended for unintentional or intentional removal of the handset from the handset cradle, either accidentally, intentionally, or the result of the action of a child or a pet. The present invention is not intended as a telephone lock mechanism but rather as a restraining mechanism for a telephone handset and for one hand removal for use thereof.

Although considerable effort has been directed to developing a telephone handset restraining mechanism, not a locking mechanism, the results to date provide only restraining mechanisms utilizing complicated lever mechanisms requiring trigger operation for release of the telephone handset. These earlier efforts to find an acceptable telephone handset restraining and release mechanism tend to be rather difficult to operate in an emergency environment or when used in a mobile vehicle where the driver of the vehicle must remove the telephone handset at the same time as operating the vehicle.

One known latch mechanism restrains the telephone handset in the handset cradle by means of a latch mechanism built into the yoke portion of the handset. The latch mechanism restrains the handset by engaging the top of an upstanding pin attached to the telephone itself. This pin protrudes outward from the telephone base and is engaged by the latch mechanism when the handset is cradled. A release button is provided on the handset to disengage the latch mechanism from the pin. Unfortunately, this early attempt at telephone handset restraining requires a specially modified telephone set resulting in a costly initial purchase and replacement item.

Another known system for restraining a telephone handset utilizes an ordinary spring as part of a toggle type latch. In environments where vibration is present, designs using ordinary springs must be carefully analyzed or avoided. Every spring/mass system has a natural resident frequency and ordinary springs have little dampening. If an environmental vibration frequency matches the resonant frequency of the spring/mass system, the spring will not perform its desired function. For this reason, use of springs having a low dampening component are not preferred.

SUMMARY OF THE INVENTION

The telephone handset restraining and release mechanism of the present invention addresses the problems and disadvantages of prior art mechanisms. The telephone handset restraining mechanism of the present invention comprises two primary parts and associated hardware that attach to a housing enclosing the telephone base. Complicated lever mechanisms are absent from the restraining and release mechanism of the present invention as is any spring operated mechanism. In addition, the enclosure and restraining and release mechanism of the present invention is adaptable to fit most telephone sets with minimum modification. The transmitter end (mouthpiece portion) of a telephone handset is restrained by a non-moving bracket that, with the base of the telephone set, forms a cup for restraining the transmitter end. The receiver end (earpiece portion) of a telephone handset is restrained by a sliding roller. As the telephone handset is inserted into the restraining mechanism, a roller parallel to the top of the receiver end and mounted on a sliding bracket frame is moved by the handset to allow insertion of the transmitter end into the formed cup. As the telephone handset moves into place in a handset cradle, the top of the handset is below the roller, and the roller frame is returned to a restraining position by a pair of silicone closed cell elastomers. This action of the roller frame and roller restrains the telephone handset in the handset cradle. To remove the handset from a restraining position in the handset cradle, a simple movement of the receiver end of the handset is all that is required.

In accordance with the present invention, there is provided apparatus for restraining a telephone handset in a handset cradle. The apparatus comprises a cup-shaped bracket for restraining the transmitter end of the telephone handset. A slidably mounted roller bracket supports a roller for restraining the receiver end of the telephone handset. A positioner having a cushioning spring contacts the slidably mounted roller bracket to bias the bracket into a telephone handset restraining position.

An advantage of the present invention is a restraining and release mechanism for a telephone handset requiring a simple one-hand motion for both restraining a handset in a handset cradle and for removing the handset for use. An additional advantage of the restraining and release mechanism of the present invention is the lack of complicated lever and trip mechanisms that have an adverse effect on reliability. In addition, a restraining and release mechanism in accordance with the present invention provides improved reliability compared to earlier restraining mechanisms and further the restraining and release mechanism is comparatively uncomplicated to operate when compared to prior art restraining and release mechanisms.

BRIEF DESCRIPTION OF THE DRAWINGS

For a more complete understanding of the present invention, reference is made to the following detailed description of an embodiment as illustrated in the drawings and as described in detail hereinafter.

FIG. 5 is a pictorial illustration of a slidable mounted roller bracket supporting a roller for restraining the receiver end of a telephone handset in a handset cradle;

FIG. 6 is a pictorial illustration of a positioning mechanism including elastomeric springs for biasing the roller bracket of FIG. 5 in a telephone handset restraining position; and FIG. 7 is a sectional view illustrating the roller bracket of FIG. 5 and the biasing bracket of FIG. 6 mounted to the housing enclosure as illustrated in FIG. 2.

DETAILED DESCRIPTION OF THE INVENTION

Figure 1:
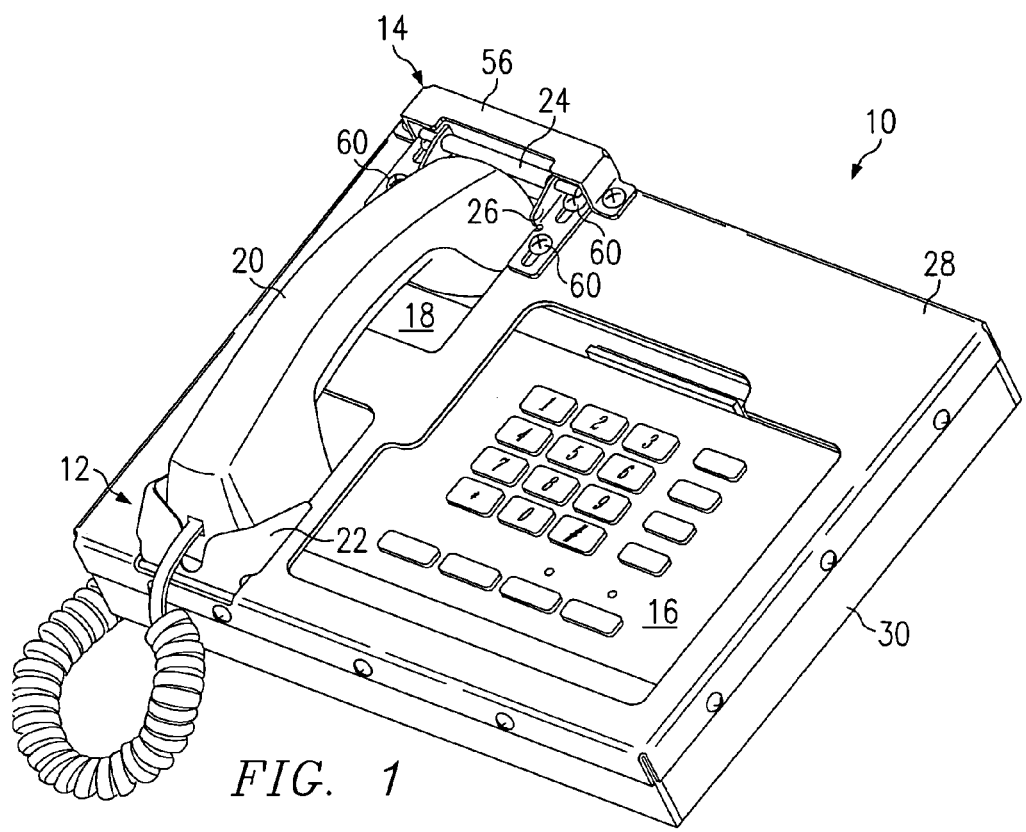
FIG. 1 is a pictorial view of the restraining and release mechanism of the present invention mounted to a housing enclosing a conventional telephone set.
Figure 2:
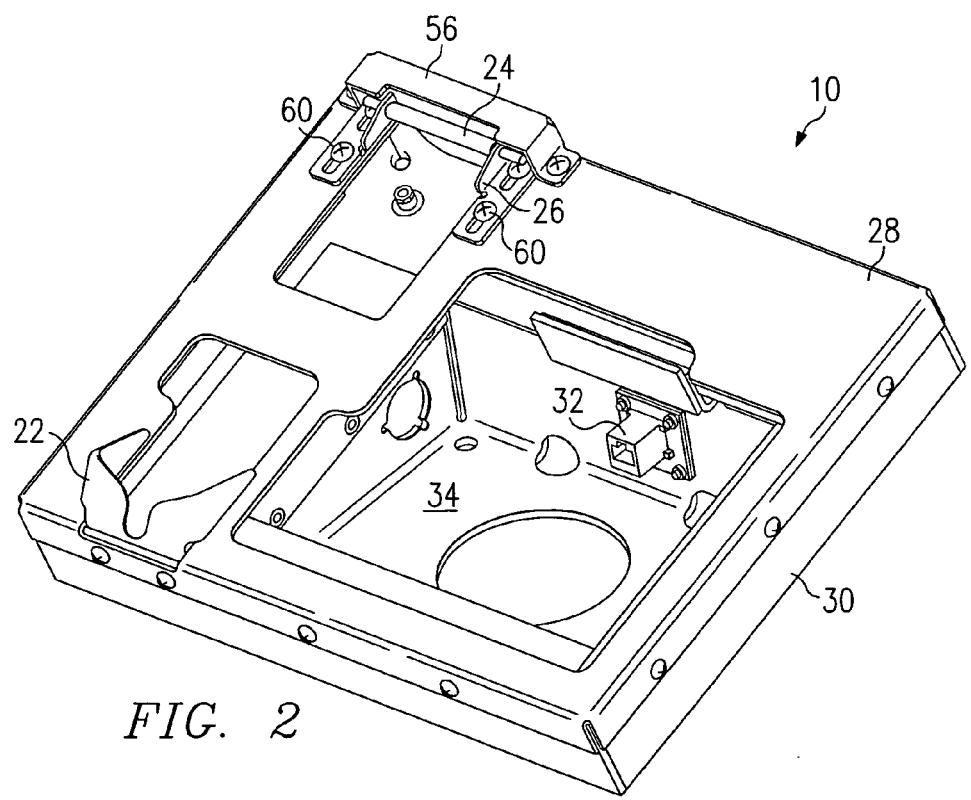
FIG. 2 is a pictorial illustration of the restraining and release mechanism of FIG. 1 without the telephone set to better illustrate the mechanism of the present invention.

Referring to FIGS. 1 and 2 there is shown a housing enclosure 10 supporting on the top surface thereof a restraining and release mechanism comprising a restraining mechanism 12 for the transmitter end of a telephone handset and a slidable restraining mechanism 14 for the receiver end of the handset. As illustrated in FIG. 1, the described embodiment of the restraining and release mechanism of the present invention is utilized with a conventional telephone set 16 having a handset cradle 18 supporting a telephone handset 20 in a conventional configuration. It should be understood that the housing enclosure 10 and the restraining and release mechanism of the present invention is adaptable to fit most telephone sets with minimal modification of the various parts making up the restraining and release mechanism.

The transmitter end of the handset 20 is restrained by a non-moving bracket 22 that, along with the handset cradle 18, forms a cup-shaped holder for receiving and restraining movement of the transmitter end of the telephone handset 20. The receiver end of the handset 20 is retained by a sliding roller 24. As the telephone handset 20 is pushed down into the handset cradle 18, the roller 24 mounted parallel to the top of the handset 20 on a sliding frame 26 is pushed out of the way of the receiver end of the handset. As the handset 20 moves into the handset cradle 18, the roller frame 26 is biased into a restraining position by a pair of silicone closed-cell elastomer springs (to be described) thereby restraining the telephone handset 20 between the non-moving bracket 22 and the roller 24. To remove the telephone handset 20 from the restraining mechanism the receiver end is lifted from the handset cradle 18 thereby displacing the roller 24 and allowing the handset 20 to be removed from the handset cradle.

Figure 3:
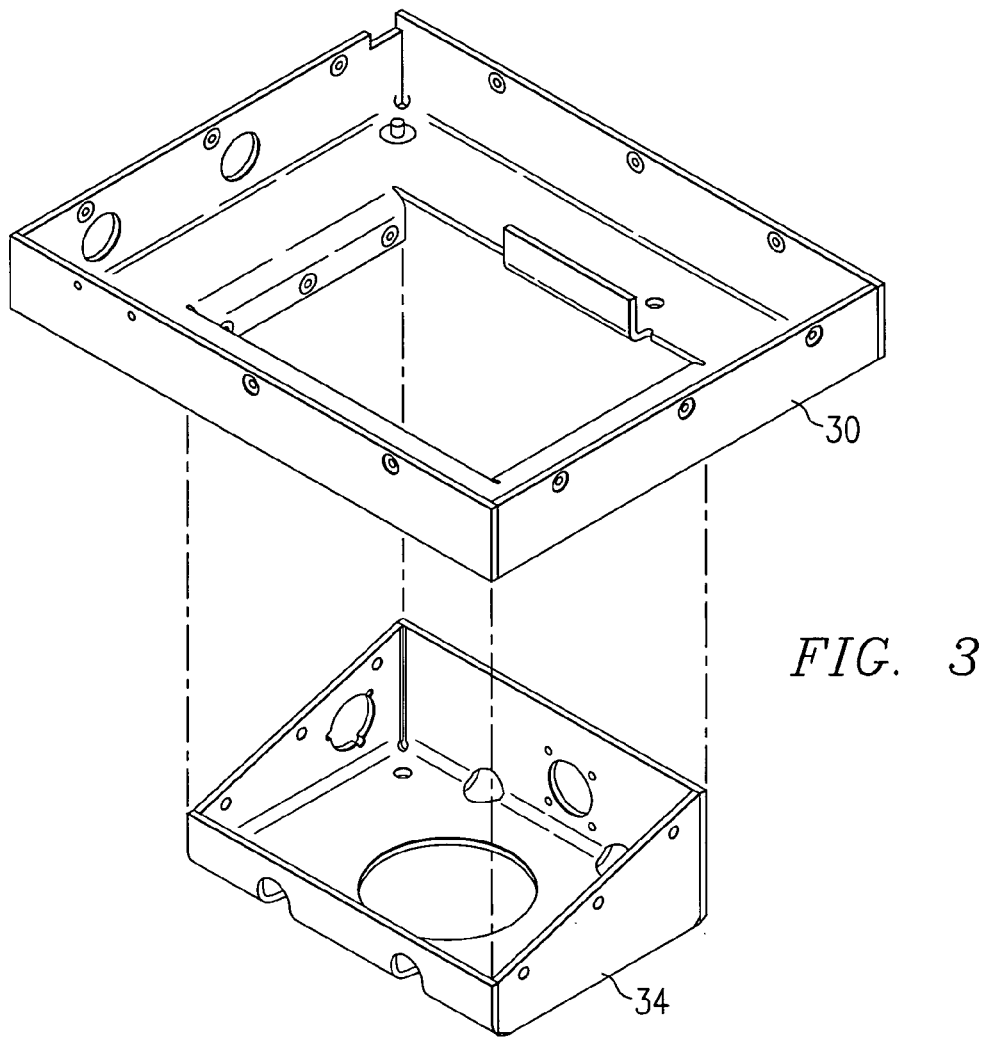
FIG. 3 is a pictorial view of the base enclosure of the housing of FIGS. 1 and 2.

Referring to FIGS. 2 and 3, the housing enclosure 10 comprises an enclosure cover 28 attached to an upper base enclosure 30 to form the housing enclosure 10 to enclose the telephone set 16. The housing 10 includes conventional connectors 32 for coupling the telephone set to telephone signal transmission lines. Attached to the upper base enclosure 30 is a lower base enclosure 34 that functions primarily as a mounting bracket for the housing 10 but also includes connector opening for various power sources to the telephone set 16. When the various parts are assembled into the housing 10 there results a ruggedized telephone set enclosure supporting the restraining and release mechanism of the present invention.

It should be understood that the housing 10 as illustrated in FIGS. 1 through 3 is one embodiment of an enclosure for the telephone set 16. The housing 10 and the restraining and release mechanism attached thereto are adaptable to almost all presently available telephone sets. Mounting the telephone set 16 in the housing 10 will not interfere with the normal functioning of any of the buttons, switches or indicators of the set. An advantage of the housing 10 and the restraining and release mechanism enables replacement of the telephone set 16 inasmuch as the housing and the restraining and release mechanism are not an integral part of the telephone set. This enables ease in repairing and maintaining the telephone set.

The enclosure cover 28, the upper base enclosure 30, and the lower base enclosure 34 are all fabricated from a sheet metal material thereby resulting in the ruggedized telephone set enclosure previously discussed.

Figure 4:
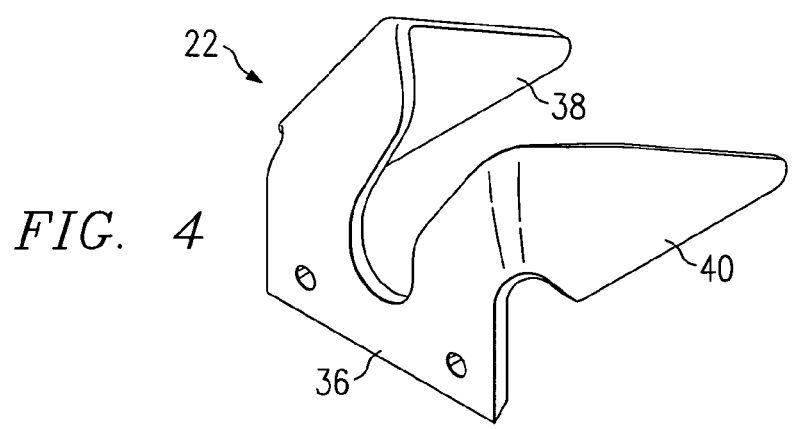
FIG. 4 is a pictorial illustration of the cup-shaped restraining mechanism of FIG. 1 for restraining the transmitter end of a telephone handset in the handset cradle.

Referring to FIG. 4, there is shown a pictorial view of the transmitter end non-movable bracket 22 that comprises a mounting plate 36 to be attached to the top surface of the enclosure 28 of the housing 10. The attachment of the non-movable bracket 22 may be by conventional fasteners as most suited for the particular construction of the housing 10. In addition to the mounting plate 36, the non-movable bracket 22 comprises two wing-shaped portions 38 and 40 configured to receive and restrain the transmitter end of a conventional telephone handset 20. The wing-shaped portions 38 and 40 are configured to accept the transmitter end of almost all known telephone sets. By slight modification of the configuration of the wing-shaped portions a non-conventional transmitter end may be received in the restraining mechanism.

When the transmitter non-movable bracket 22 is mounted to the enclosure cover 28, the wing-shaped portions 38 and 40 form a cup-shaped enclosure with the handset cradle 18 to securely restrain movement of the transmitter end of a telephone handset. To provide a ruggedized restraining mechanism the transmitter non-movable bracket 22 is formed from sheet metal or hard plastic typically having a thickness dimension of one-eighth inch. When fabricated from a hard plastic, the transmitter non-movable bracket 22 may be molded into the desired configuration to ensure a cup-shaped enclosure closely fitting the transmitter end of a telephone handset.

Referring to FIG. 6, there is pictorially illustrated the restraining mechanism 14 for restraining and releasing the receiver end of a telephone handset 20. The mechanism 14 comprises a backplate 42 having supporting arms 44 and 46 extending perpendicular thereto. Each of the supporting arms 44 and 46 is provided with a roller shaft bracket 48 and 50, respectively. The roller shaft brackets 48 and 50 are formed at right angles to the respective supporting arm and support a roller shaft 52. Rotatably mounted to the roller shaft 52 is the roller 24 as shown in FIGS. 1 and 2. To provide a ruggedized restraining and release mechanism, the restraining mechanism 14 is preferably fabricated from a sheet metal such as one-eighth inch stock.

Each of the supporting arms 44 and 46 is provided with two slot openings 54 for slidably supporting the restraining bracket 14 on the top surface of the enclosure cover 28.

As illustrated in FIGS. 1 and 2, the restraining bracket 14 is mounted to the top surface of the enclosure cover 28 by four machine screws having a conventional Phillips head configuration.

Referring to FIG. 5, there is illustrated a top bracket 56 mounted in proximity to the restraining bracket 14 to the top surface of the enclosure cover 28. Secured to the inner back surface of the top bracket 56 are two cushioning spring pads 58 illustrated in the shape of small cubes. Preferably, each of the cushioning spring pads 58 comprises a silicone closed cell elastomer, although other materials having elastic characteristics are acceptable alternatives. The function of the tops bracket 56 and the cushioning spring pads 58 is to bias the restraining bracket 14 into a position to retain the telephone handset 20 in the handset cradle 18.

Referring to FIG. 7, there is shown a cross section of the housing 10 including the enclosure cover 28 and the upper base enclosure 30. The cross section illustration of FIG. 7 is taken along the line 7—7 of FIG. 2. Also shown in section is the restraining mechanism 14 and the top bracket 56 all mounted to the top surface of the enclosure cover 28. As illustrated, the restraining mechanism 14 is mounted to the upper surface of the enclosure cover 28 by means of machine screws 60. Each of the machine screws 60, only the machine screws 60 for the supporting arm 44 are illustrated in FIG. 7, receive a spacer 62 sized to fit within the slot openings 54 and also having a thickness dimension to allow sliding motion to the restraining mechanism 14.

As illustrated in FIG. 7, the cushioning spring pads 58 (only one shown) contacts the backplate 42 of the restraining mechanism 14 when the top bracket 56 is mounted to the top surface of the enclosure cover 28. This assembly of the restraining mechanism 14 and the top bracket 56 provides a biasing force by means of the cushioning spring pads 58 to bias the roller 24 to engage the top surface of the receiver end of the telephone handset 20 when the handset is positioned within the handset cradle 18. To remove the telephone handset 20 from the cradle 18, the handset is raised from the handset cradle 18 thereby pushing the roller 24 to compress the cushioning spring pads 58. This allows the roller 24 to move a distance sufficient to allow removal of the telephone handset 20.

While a preferred embodiment of the invention has been shown and described herein, it is to be understood that various other adaptations and modifications may be made within the spirit and scope of the invention. Further, it should also be understood that the restraining and release mechanism described herein finds utility in applications other than securing a telephone handset in a handset cradle. Although not specifically described herein, such other uses of the invention are also contemplated and covered by the scope of the invention as defined by the appended claims.

What is claimed is:

1. Apparatus for restraining a telephone handset in a handset cradle, comprising:
   a housing having a support surface and enclosing the handset cradle;
   a cup-shaped enclosure mounted to the support surface of the housing to restrain the transmitter end of the telephone handset in the handset cradle;
   a roller bracket slidably mounted to the support surface of the housing in proximity to the receiver end of the telephone handset;
   a roller mounted to the roller bracket for engaging the receiver end of the telephone handset when in a telephone handset restraining position;
   a support bracket mounted to the support surface of the housing, the support bracket mounted in proximity to the roller bracket; and
   a spring pad supported by the support bracket to bias the roller bracket to enable the roller to engage the receiver end of the telephone handset thereby positioning the roller into the handset restraining position.

2. Apparatus for restraining a telephone handset as in claim 1 wherein the spring pad comprises a silicone closed cell elastomer.

\* \* \* \* \*